United States Patent [19]

Költgen

[11] 4,211,014
[45] Jul. 8, 1980

[54] DEVICES FOR INSPECTING BORES

[76] Inventor: Hermann Költgen, Schottener Weg 6, D-61 Darmstadt, Fed. Rep. of Germany

[21] Appl. No.: 958,466

[22] Filed: Nov. 7, 1978

[30] Foreign Application Priority Data

Nov. 12, 1977 [DE] Fed. Rep. of Germany ... 7734751[U]

[51] Int. Cl.² ............................................. G01B 5/12
[52] U.S. Cl. ................................ 33/178 R; 33/174 Q
[58] Field of Search ............. 33/174 Q, 178 R, 178 B, 33/178 E

[56] References Cited

U.S. PATENT DOCUMENTS

| 1,048,073 | 12/1912 | Hirth | 33/178 R |
|---|---|---|---|
| 1,429,556 | 9/1922 | Bartholdy | 33/178 R |
| 1,619,834 | 3/1927 | Stein | 33/178 R |
| 2,199,052 | 4/1940 | Lee | 33/178 B |
| 2,312,222 | 2/1943 | Tanner | 33/178 R |
| 2,680,912 | 6/1954 | Wylie | 33/178 R |
| 2,721,392 | 10/1955 | Barrett | 33/178 R |
| 2,842,858 | 7/1958 | Mennesson | 33/178 R |
| 2,956,342 | 10/1960 | Eisele | 33/174 Q |
| 4,030,202 | 6/1977 | Fadl et al. | 33/178 E |
| 4,067,114 | 1/1978 | Meyer, Jr. | 33/178 R |

FOREIGN PATENT DOCUMENTS 184916 5/1907 Fed. Rep. of Germany ........ 33/178 R

Primary Examiner—Richard R. Stearns
Attorney, Agent, or Firm—James Creighton Wray

[57] ABSTRACT

A device for inspecting bores comprises a plug gauge (2). A shank (3) of the plug gauge (2) mounts two limbs (7, 7') that mount sensing pins (15, 15') housed in openings (14) in the plug gauge (2) and resiliently bias the pins outwardly. A needle (10), mounted for axial movement in the plug gauge (2), has a pointed region at one end for contacting inner edges (9, 9') of the limbs (7, 7') and a surface (12) at its other end for contact with a measuring pin of an indicator device (not shown). In use, the plug gauge (2) is inserted into a bore. (The plug gauge (2) may be of the same diameter as a go plug gauge for the bore whereby it functions as a go plug gauge). The plug gauge (2) is displaced and/or rotated and the pins (15, 15') move radially to follow the outline of the bore. Radial movement of the pins is converted to axial movement of the needle (10) by cooperation of the edges (9, 9') and the pointed end region of the needle, and is displayed on the indicator device. The number of sensing pins can be more than or less than two. In a modification (FIG. 5), the limbs (7, 7') and the pointed end region of the needle (10) are omitted and a pivotable element (19) converts radial movement of a sensing pin (15B) to axial movement of the needle.

9 Claims, 8 Drawing Figures

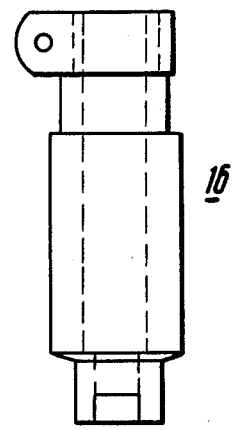
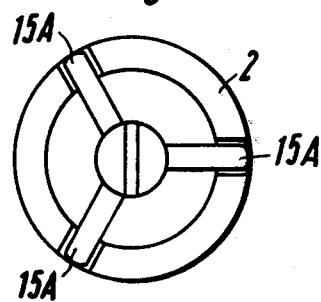
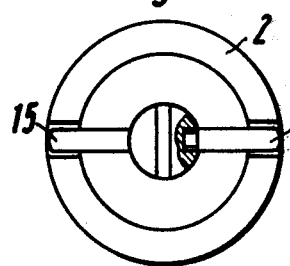
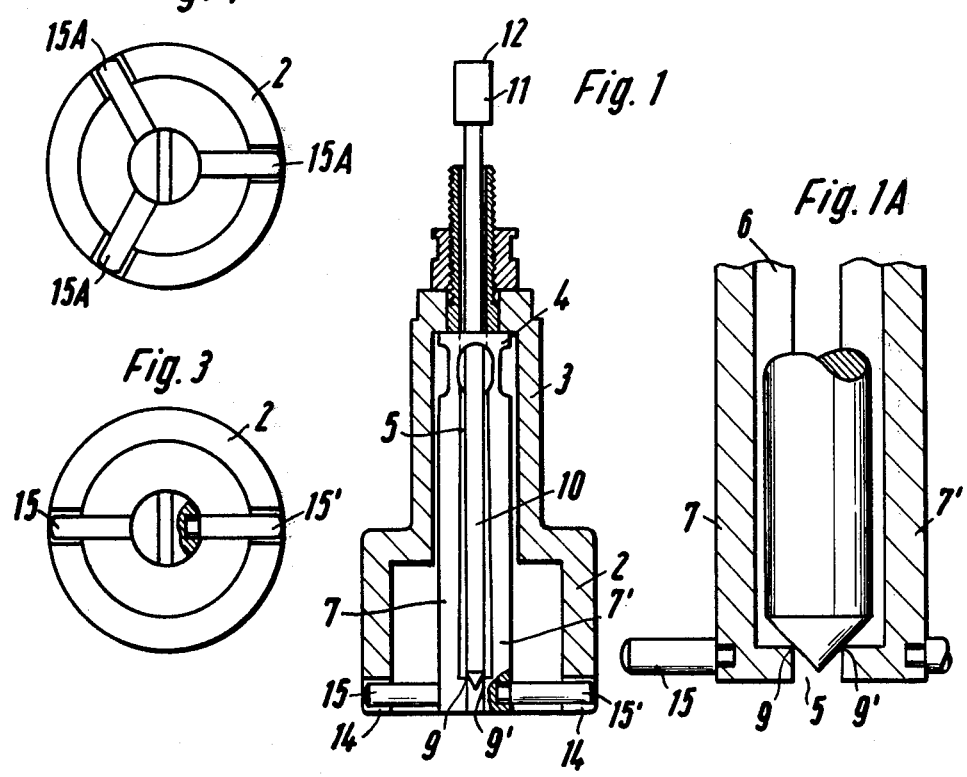

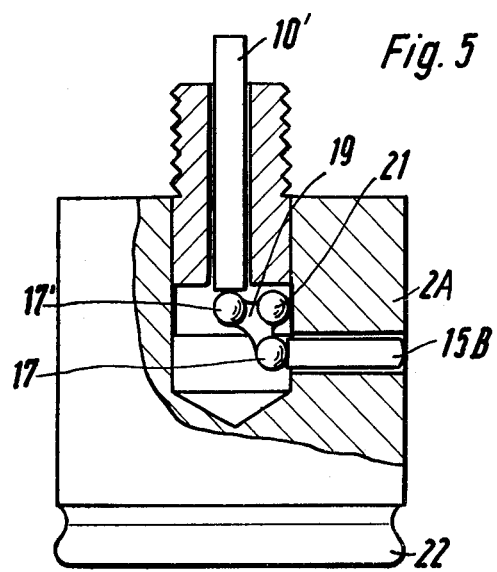
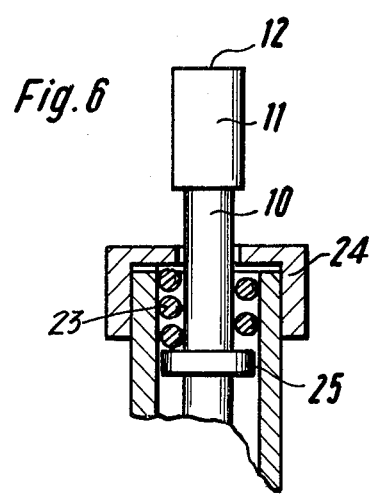
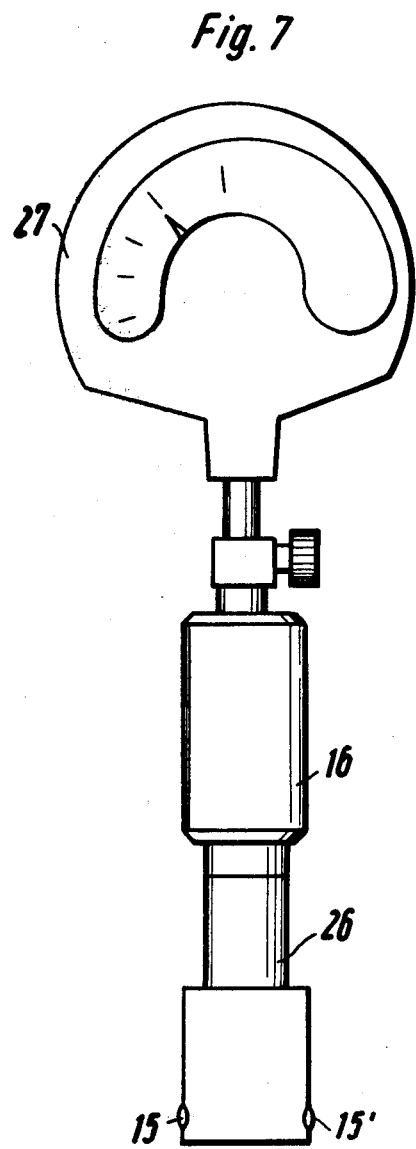

DEVICES FOR INSPECTING BORES

BRIEF SUMMARY OF THE INVENTION

This invention relates to devices for inspecting bores.

So-called plug gauges, which in most cases have a respective cylindrical plate member or plug at each of the two ends of a handle, are generally used for checking bores (e.g. through holes or blind holes). The diameters of the two cylindrical members are slightly different. The bore is considered as being satisfactory, or within the permissible tolerances, when the smaller gauge plug or "go plug" can be inserted into the bore, but the larger gauge plug cannot be inserted into the bore. However, when using these plug gauges, it is not possible to determine precisely whether the bore deviates from a precise cylindrical form, for example if the bore is slightly tapered or barrel-shaped or elliptical. Other measuring devices, for example so-called sensing head measuring devices, are used for checking or measuring the above-mentioned deviations from the desired form of the bore.

According to the present invention there is provided a device for inspecting bores, the device comprising a hollow plug gauge which can be inserted into a bore to be inspected, at least one opening in the plug gauge housing a radially-disposed sensing pin mounted for longitudinal movement against spring pressure, a needle arranged axially in the plug gauge and capable of being axially displaced, and movement translation means operative to translate movement of the sensing pin in the radial direction into axial displacement of the needle, the needle having an end surface capable of being contacted, in use, by a measuring pin of an indicator device to enable indication of the axial position of the needle.

Devices embodying the invention and described hereinbelow can be used for checking the deviation of a bore from a desired form by displacing and/or rotating the device in the bore whereby the sensing pin follows the outline of the bore, any radial movement of the pin being translated into axial movement of the needle. The position of the needle is displayed by a indicator device which, in use, is fitted to the device, whereby the form of the bore can be observed and any departure from the desired form can be noted. The indicator device may be, for example, a dial gauge, a fine indicator or an electrical sensing means.

The plug gauge of a device embodying the invention may have the same size and shape as a "go plug" for the bore to be inspected whereby the device can also perform the function of a conventional "go plug", e.g. to check that a circular bore has at least a minimum diameter. However, in some cases it may be expedient for the plug gauge to be smaller in size than a "go plug" for the bore to be inspected.

DESCRIPTION OF THE DRAWING

The invention will now be further described, by way of example, with reference to the accompanying drawings, in which corresponding components are denoted throughout by the same reference numerals, and in which:

FIG. 1 is a view in longitudinal section of a first device embodying the invention;

FIG. 1A shows a structural detail of the device of FIG. 1 on an enlarged scale;

FIG. 2 shows a holder which can be fitted to the device of FIG. 1, for carrying an indicator device;

FIG. 3 is a view from below of the device of FIG. 1;

FIG. 4 is a view from below of a modification, provided with three sensing pins, of the embodiment of FIGS. 1, 1A and 3;

FIG. 5 shows a structural detail of a further modified form of the embodiment of FIG. 1 in side view and in partial cross-section;

FIG. 6 shows a structural detail of an alternative form of the embodiment of FIG. 1; and FIG. 7 shows the device of FIGS. 1, 1A and 3, or any of the illustrated modifications thereof, and the holder of FIG. 2, together with a dial gauge held in the holder to serve as the indicator device.

SPECIFICATION

The bore inspection device shown in FIGS. 1, 1A and 2 comprises a hollow, circular plug gauge 2 which is in the form of a so-called go plug gauge and therefore has a diameter which is undersize, i.e. which corresponds to the minimum permitted diameter of a bore of nominal diameter. Fixed in a shank 3 of the go plug gauge 2 is a sensing head 4 which comprises a steel member provided with an axial central slot 5 and a blind bore 6 defining two resiliently deformable limbs 7 and 7'. The limbs 7 and 7' of the steel member each have a sharp edge 9 and 9', respectively, in their free end regions, on facing sides thereof. Disposed between the two edges 9 and 9' is a patered or wedge-shaped pointed end region of a needle member 10 which is mounted for axial displacement in the sensing head 4. The other or upper end of the needle member 10 has an enlarged region 11 having a face-ground end surface 12 against which bears a measuring pin of an indicator device (not shown). Two sensing pins, 15 and 15' respectively, whose inner ends are screwed in the associated limbs 7 and 7' and whose outer ends are rounded, are disposed in diametrically opposed openings 14 in the hollow plug gauge 2.

For the purposes of carrying out a bore measuring operation, the indicator device is fitted on to the device as shown in FIG. 1 by means of the holder 16 shown in FIG. 2, in such a way that the measuring pin of the indicator device is in contact with the end surface 12. If the plug gauge 2 can be inserted into the bore to be checked, then a "go check", i.e. a check that the bore has a diameter at least equal to the minimum permitted diameter, has been carried out. If the plug gauge 2 is then displaced or rotated in the bore, the rounded ends of the sensing pins 15 and 15', which are resiliently urged outwardly by the limbs 7 and 7', sense the walls of the bore. By virtue of radial displacement of the sensing pins 15 and 15', which occurs during the sensing operation, the limbs 7 and 7' and their edges 9 and 9' are moved towards each other to a greater or lesser extent and thereby the drive needle member 10 is displaced upwardly to a greater or lesser extent, such displacement being indicated on the indicator device.

If the plug gauge 2 is moved in the bore, then the indicator device (e.g. dial gauge) indicates the respective diameter of the bore between the ends of the sensing pins 15 and 15'. Any barrelling or tapering of the bore can be precisely and rapidly determined by axial displacement of the plug gauge 2. It is also possible to precisely determine any so-called "initial width" of the bore, i.e. any enlargement in the bore diameter at the edge of the bore due to machining (e.g. lapping or honing) of the workpiece housing the bore. Any ovalness of the bore can be immediately measured and checked by turning the plug gauge 2.

In some cases it may be advantageous, as shown in FIG. 4, to provide three sensing pins 15A which are advantageously each displaced by 120° relative to each other. (In this case, each pin 15A may be mounted on a respective one of three limbs corresponding to the limbs 7, 7'). This arrangement can be used to check for example bore forms such as the so-called triple equal-width (polygonal) bore.

FIG. 5 shows an embodiment with only one sensing pin 15B. The sensing pin 15B is mounted so as to be longitudinally displaceable in the plug gauge 2A, and its inward end lies against an associated co-operating surface 17 of a pivotable link 19 which converts radial displacement of the sensing pin 15B into axial displacement of the needle member 10' as the lower end surface of the needle member 10' bears against an associated co-operating surface 17' of the link 19. A pivot member 21 of the link 19, by which the link 19 is pivoted, has an axis perpendicular to the axes of the drive needle member 10 and the sensing pin 15B.

The needle member 10 can be resiliently urged against the sensing pins 15, 15', 15A or 15B by a spring disposed in the indicator device (e.g. dial gauge) employed. Alternatively, as shown in FIG. 6, a spring 23 can be arranged at the upper end of the device as shown in FIG. 1, the spring bearing at one end against a cap 24 screwed onto the the device and at the other end against a shoulder 25 on the needle member 10.

The plug gauge 2 or 2A may have a broken edge or may be provided with a pilot bevel 22, in order to facilitate insertion of the gauge into the bore.

The plug gauge 2 or a cylindrical casing thereof can comprise hardened steel or hard metal or cemented carbide. So also can the sensing pins 15, 15', 15A or 15B.

In some cases it is advantageous for the diameter of the plug gauge 2 to be substantially smaller than, for example some hundredths of a millimeter smaller than, the diameter of the bore to be measured. In this case the gauge cannot therefore be used to carry out a "go check", but the greater measuring range and the less expensive construction are suitable for many areas of use.

FIG. 7 shows a device 26 according to FIGS. 1, 1A and 3, or according to any of the above-described modifications thereof, with the holder 16 of FIG. 2 fitted thereon and holding a dial gauge 27 which serves as the indicator device.

What I claim is:

1. A device for inspecting bores, the device comprising a hollow plug gauge which can be inserted into a bore to be inspected, at least one opening in the plug gauge housing a radially-disposed sensing pin mounted for longitudinal movement against spring pressure, a needle arranged axially in the plug gauge and capable of being axially displaced, and movement translation means operative to translate movement of the sensing pin in the radial direction into axial displacement of the needle, the movement translation means comprising a sensing head having a resilient limb acted upon by the sensing pin and providing said spring pressure on the sensing pin, and a surface on an end region of the needle contacting an inner edge of the limb, said needle surface being inclined to the longitudinal axis of the needle whereby radial movement of the pin produces displacement of the needle, the needle having a second and end surface capable of being contacted, in use, by a measuring pin of an indicator device to enable indication of the axial position of the needle.

2. A device according to claim 1, provided with a holder for holding a said indicator device such that the measuring pin of the indicator device contacts said end surface.

3. A device according to claim 2, wherein a said indicator device is fitted to said holder.

4. A device according to claim 1, wherein there are two said sensing pins housed in diametrically opposed said openings in the plug gauge, and wherein the sensing head comprises two said limbs each acted upon by a respective one of the sensing pins.

5. A device according to claim 4, wherein said end region of the needle is of a wedge-shaped configuration.

6. A device according to claim 1, wherein said end region of the needle is of a tapered configuration.

7. A device according to claim 1, wherein at least an end region of the periphery of the plug gauge is of the same size and shape as a go plug for the bore to be inspected.

8. A device according to claim 1, wherein at least an end region of the periphery of the plug gauge is of the same shape but of a smaller size than a go plug gauge for the bore to be inspected.

9. A device according to claim 1, including spring means axially biassing said needle to provide said spring pressure on said sensing pin.

* * * * *